United States Patent [19]

Scholz et al.

[11] 4,186,941

[45] Feb. 5, 1980

[54] INFLATABLE IMPACT PROTECTION CUSHION

[75] Inventors: Hansjürgen Scholz, Echterdingen; Luigi Brambilla, Böblingen; Hans-Gerd Backhaus, Stuttgart, all of Fed. Rep. of Germany

[73] Assignee: Daimler-Benz Aktiengesellschaft, Fed. Rep. of Germany

[21] Appl. No.: 902,495

[22] Filed: May 3, 1978

[30] Foreign Application Priority Data

May 18, 1977 [DE] Fed. Rep. of Germany ....... 2722551

[51] Int. Cl.² .............................................. B60R 21/08
[52] U.S. Cl. ..................................... 280/743; 280/734
[58] Field of Search ............... 280/743, 734, 735, 728, 280/742, 738, 739, 732

[56] References Cited

U.S. PATENT DOCUMENTS

| | | | |
|---|---|---|---|
| 3,473,824 | 10/1969 | Carey | 280/729 |
| 3,758,131 | 9/1973 | Stephenson | 280/735 |
| 3,797,855 | 3/1974 | Wright | 280/743 |
| 3,990,726 | 11/1976 | Oka | 280/743 X |

Primary Examiner—John P. Silverstrim
Attorney, Agent, or Firm—Craig and Antonelli

[57] ABSTRACT

An inflatable impact cushion for passengers of a motor vehicle, which in case of an accident is adapted to be selectively filled with the available gas by the increasing pressure by means of several sequentially triggerable ignition stages depending on the strength of the deceleration; in the starting condition, a portion of the protective cushion is separated off by a seam or the like, while the seam or the like is destroyed by the increasing pressure in such a manner that in the end condition the entire volume of the protective cushion is available.

6 Claims, 3 Drawing Figures

FIG.1
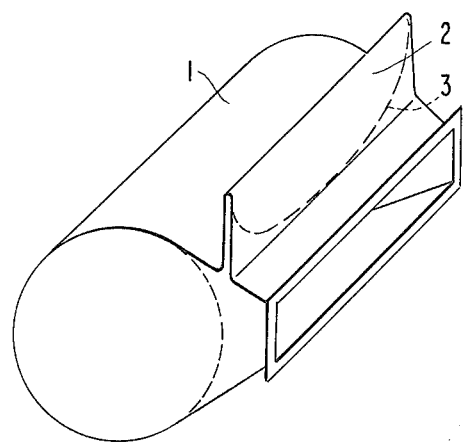
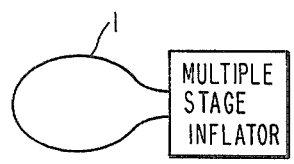
FIG.3
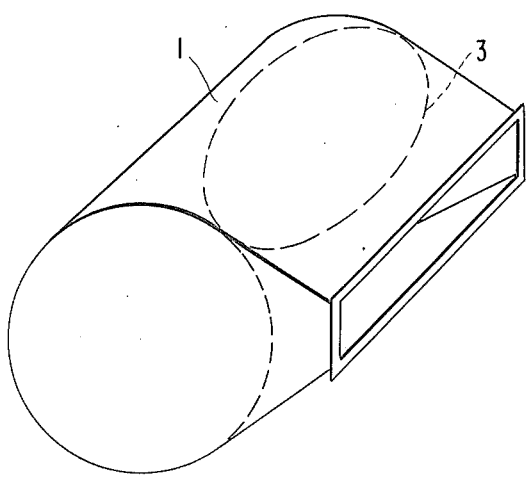
FIG.2

INFLATABLE IMPACT PROTECTION CUSHION

The present invention relates to an inflatable impact protection cushion for passengers of a motor vehicle, which in case of an accident is adapted to be filled with the available gas as a result of an increasing pressure by several sequentially triggerable ignition stages depending on the magnitude of the deceleration.

Impact protection installations are known in the art in which, depending on the gravity of the accident, one or several ignition stages are adapted to be triggered simultaneously or sequentially. With a slight front end impact, for example, a signal for a first ignition stage is triggered corresponding to the strength or magnitude of the deceleration and in case of a serious accident, several or all ignition stages are triggered simultaneously or sequentially for the filling of impact protection cushions for the vehicle passengers.

The present invention is concerned with the task to so construct a known impact protection cushion by simplest possible means that its protective action adapts itself to the gravity of a given accident.

The underlying problems are solved according to the present invention in that in the starting condition, a part of the protective cushion is separated off by a seam or the like and in that this seam or the like is destroyed by the increasing pressure so that in the end condition the entire volume of the protective cushion is available.

Accordingly, it is an object of the present invention to provide an inflatable impact protection cushion which avoids by simple means the aforementioned shortcomings and drawbacks encountered in the prior art.

Another object of the present invention resides in an inflatable impact protection cushion for the passengers of a motor vehicle whose protective action will automatically adapt itself to the seriousness of a given accident.

A further object of the present invention resides in an inflatable impact protection cushion for motor vehicle passengers which optimizes the protective action thereof by extremely simple means.

Still a further object of the present invention resides in an inflatable impact protection cushion of the type described above which can be manufactured in a simple and relatively inexpensive manner to assure optimum protective effect for the passengers.

These and other objects, features and advantages of the present invention will become more apparent from the following description when taken in connection with the accompanying drawing which shows, for purposes of illustration only, one embodiment in accordance with the present invention and wherein:

FIG. 1 is a perspective view of an impact protection cushion according to the present invention in the condition after the firing of a first ignition stage in case of a light front end impact; and FIG. 2 is a perspective view of the same impact protection cushion as shown in FIG. 1, after the firing of a following ignition stage in case of a serious front-end impact.

FIG. 3 is a schematic illustration of an inflated cushion and multiple stage inflator.

Referring now to the drawing wherein like reference numerals are used throughout the two views to designate like parts, FIG. 1 illustrates an inflatable impact protection cushion 1, for example, after a slight accident, whereby according to the present invention a part 2 of the protective cushion 1 which is constructed as a fold or pleat is separated off in the starting condition by an approximately semi-eliptically shaped seam 3 or the like in such a manner that only a partial volume of the protective cushion 1 is available for the inflation by a corresponding pressure.

FIG. 2 illustrates the same impact protective cushion 1 after a serious accident, after the seam 3 or the like has been destroyed by the increasing pressure so that in the end condition the entire volume of the protective cushion 1 is thus available.

Finally, also a further embodiment of a protective cushion with a separate and/or folded part is feasible within the scope of the present invention, in which the seam is so constructed that the protective action of the available inflatable cushion volume can be matched to the respective gravity of the accident.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An inflatable impact protection cushion for a passenger of a motor vehicle, said cushion comprising a bag expandable to a maximum volume and separating means separating a portion of the bag from the remainder thereof for limiting the degree of expansion of said bag to a volume less than said maximum volume when an internally supplied gas exerts an expansion pressure below a predetermined value, said separating means being constructed for being rendered inoperative when said gas exerts an expansion pressure greater than said predetermined value to enable said bag to be expanded to said maximum volume, and inflation means for initially supplying said gas in a manner exerting said pressure less than said predetermined value to initially expand said bag to said lesser volume and for subsequently supplying an additional amount of gas in a manner exerting a pressure greater than said predetermined value to expand said bag to said maximum volume.

2. An inflatable cushion according to claim 1, wherein said inflation means comprises multiple ignition stages and means operable for selectively triggering said ignition stages.

3. An inflatable impact protection cushion according to claim 1 or 2, characterized in that the separating means is a seam.

4. An inflatable impact protection cushion according to claim 3, characterized in that the seam is approximately semi-eliptical in shape.

5. An inflatable impact protection cushion according to claim 4, characterized in that the seam of the separating means, separates off a pleat from the remaining volume of the cushion.

6. An inflatable impact protection cushion according to claim 1 or 2 characterized in that the separating means, separates off a pleat from the remaining volume of the cushion.

* * * * *